US012737527B2

(12) United States Patent
Yana et al.

(10) Patent No.: US 12,737,527 B2
(45) Date of Patent: Sep. 15, 2026

(54) DOCUMENT PROCESSING FOR REDUCING DATA USAGE

(71) Applicant: KYOCERA Document Solutions Inc., Osaka (JP)

(72) Inventors: Regil Yana, Torrance, CA (US); Kendrick Esperanza Wong, Torrance, CA (US); Kilho Shin, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 225 days.

(21) Appl. No.: 18/643,744

(22) Filed: Apr. 23, 2024

(65) Prior Publication Data

US 2025/0328720 A1 Oct. 23, 2025

(51) Int. Cl.
*G06F 40/103* (2020.01)
*G06V 30/10* (2022.01)
*G06V 30/414* (2022.01)

(52) U.S. Cl.
CPC ............ *G06F 40/103* (2020.01); *G06V 30/10* (2022.01); *G06V 30/414* (2022.01)

(58) Field of Classification Search
CPC ..... G06F 40/103; G06V 30/10; G06V 30/414
See application file for complete search history.

(56) References Cited

U.S. PATENT DOCUMENTS

| | | | | |
|---|---|---|---|---|
| 6,079,885 | A * | 6/2000 | Sano | H04N 1/407 400/70 |
| 8,126,270 | B2 * | 2/2012 | Iinuma | G06V 30/413 382/178 |
| 8,249,356 | B1 * | 8/2012 | Smith | G06V 30/414 382/199 |
| 8,279,472 | B2 * | 10/2012 | Sato | G06K 15/181 358/1.18 |
| 12,530,209 | B2 * | 1/2026 | Hahn | G06F 9/451 |
| 2005/0111053 | A1 * | 5/2005 | Yoshida | G06T 11/23 358/448 |
| 2006/0187241 | A1 * | 8/2006 | Boler | G06T 11/60 345/660 |
| 2007/0171473 | A1 | 7/2007 | Iwasaki | |
| 2009/0021586 | A1 * | 1/2009 | Yumiki | H04N 23/6815 348/208.4 |
| 2009/0074291 | A1 * | 3/2009 | Iinuma | G06V 30/413 382/178 |
| 2009/0161159 | A1 * | 6/2009 | Sato | G06K 15/181 358/1.15 |
| 2009/0234882 | A1 | 9/2009 | Ota et al. | |

(Continued)

*Primary Examiner* — Kenny Nguyen
(74) *Attorney, Agent, or Firm* — The Webostad Firm, a Prof. Corp.

(57) ABSTRACT

Apparatuses and methods relate generally to reducing data usage by a document processing system. In one such method, a segmented layout of a page from a preprocessed image thereof is detected. Components of the layout are separated into one or more blocks. Each type of the one or more blocks are identified. A block of the one or more blocks identified as a text block is converted to text. Meta information for the block is stored. A formatted page for the page including the text and the meta information is constructed. It is determined whether the formatted page has a smaller storage size than the preprocessed image associated with the formatted page.

20 Claims, 9 Drawing Sheets

(56) References Cited

U.S. PATENT DOCUMENTS

| | | | | |
|---|---|---|---|---|
| 2014/0086506 | A1* | 3/2014 | Ichikawa | G06T 5/73<br>382/275 |
| 2014/0258650 | A1* | 9/2014 | Vishniac | G06F 3/064<br>711/159 |
| 2020/0320165 | A1* | 10/2020 | Srinivasan | G06V 30/414 |
| 2025/0005828 | A1* | 1/2025 | Levins | G06Q 30/018 |
| 2025/0111690 | A1* | 4/2025 | Lin | G06V 30/19193 |

* cited by examiner

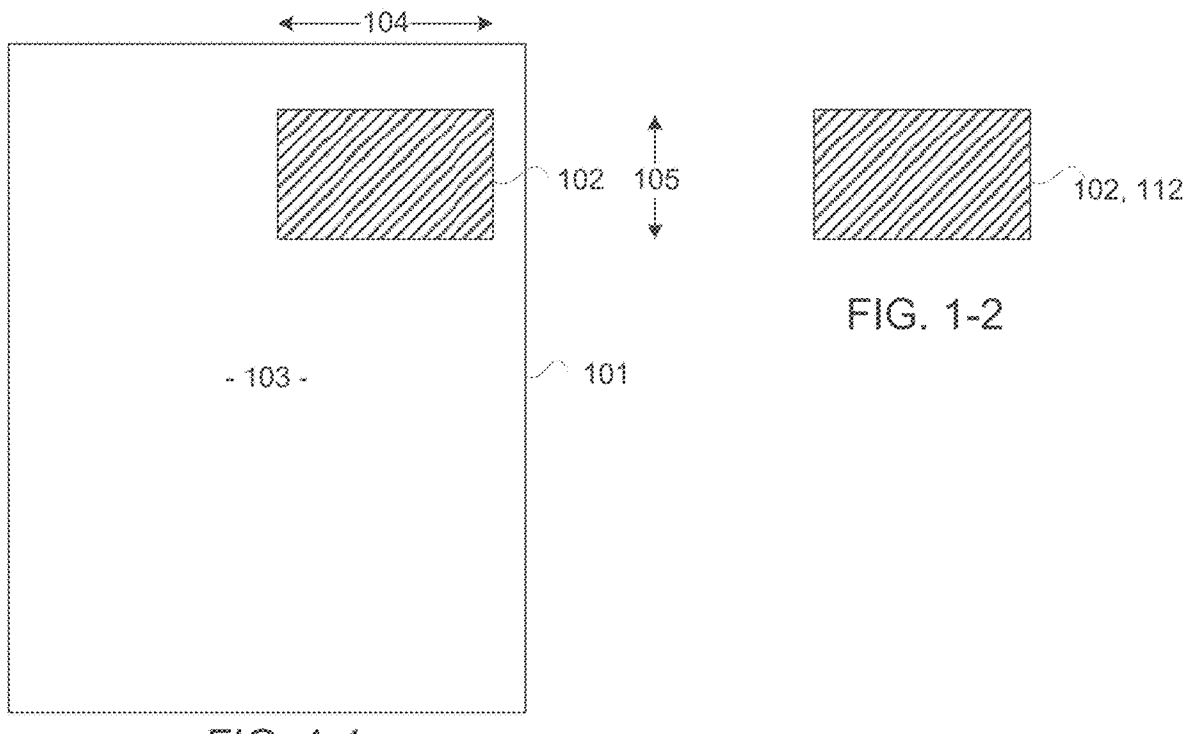
FIG. 1-1
FIG. 1-2
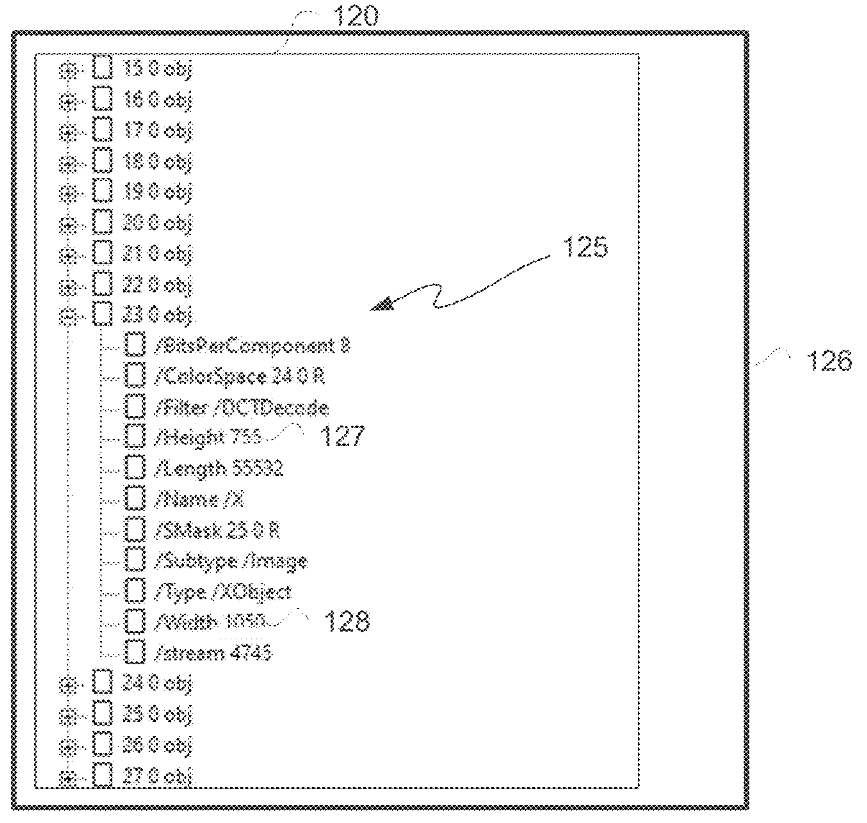
FIG. 1-3

DOCUMENT PROCESSING FOR REDUCING DATA USAGE

FIELD

The following description relates to data processing. More particularly, the following description relates to reducing data usage by a document processing system.

BACKGROUND

Conventionally, when a user uses a send command to email in a document processing system, such as a multi-function printer ("MFP") for example, and uses a portable document format ("PDF") or another document format as a file format, a resulting PDF file generated may be relatively large file. This can be due an MFP treating each whole page scanned as an image regardless of the type of data on such printed material. This may happen even when page contents only occupies a small portion of the area of such a page. Moreover, even if a whole page image is compressed, a resulting file may still be large enough to cause sending issues because of file size. Accordingly, it would be desirable and useful to provide a programmed document processing system that addresses one or more of these issues.

SUMMARY

In accordance with one or more below described examples, a method relating generally to reducing data usage by a document processing system for is disclosed. In such a method, a segmented layout of a page from a preprocessed image thereof is detected. Components of the layout are separated into one or more blocks. Each type of the one or more blocks are identified. A block of the one or more blocks identified as a text block is converted to text. Meta information for the block is stored. A formatted page for the page including the text and the meta information is constructed. It is determined whether the formatted page has a smaller storage size than the preprocessed image associated with the formatted page.

In accordance with one or more below described examples, an apparatus relating generally to reducing data usage by a document processing system is disclosed. In such an apparatus, the document processing system has a system memory, a data storage, one or more processor units, and an interface. The system memory is configured to store program code including document services. The interface is coupled for receiving user requests for the document services. In response to executing the program code, the document processing system is configured to initiate operations for implementing a process for reducing data usage, the process including: detecting a segmented layout of a page from a preprocessed image thereof; separating components of the layout into one or more blocks; identifying each type of the one or more blocks; converting a block of the one or more blocks identified as a text block to text; storing meta information for the block; constructing a formatted page for the page including the text and the meta information; and determining whether the formatted page has a smaller storage size than the preprocessed image associated with the formatted page.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-1 is a block diagram of a top-down view depicting an example of a sheet good.

FIG. 1-2 is a block diagram of a top-down view depicting an example of a sheet good having a same size as image thereof.

FIG. 1-3 is a pictorial diagram depicting an example of a PDF viewer screen display of the scan of FIG. 1-1 after processing same.

FIG. 1-4 is a block diagram of a top-down view depicting an example of a preprocessed scanned image of a conventional scan.

FIG. 1-5 is a block diagram of a top-down view depicting an example of a segmented layout of a page from a preprocessed image, such as the preprocessed scanned image of FIG. 1-4.

FIG. 2 is a flow diagram depicting an example of a data usage reduction flow ("flow").

FIG. 3 is a pictorial diagram depicting an example of a user interface display of a touch screen of a document processing system.

FIG. 4 is a pictorial diagram depicting an example of a network.

FIG. 5 is a block diagram depicting an example of a portable communication device.

DETAILED DESCRIPTION

Figures 1, 2, 3, 4:
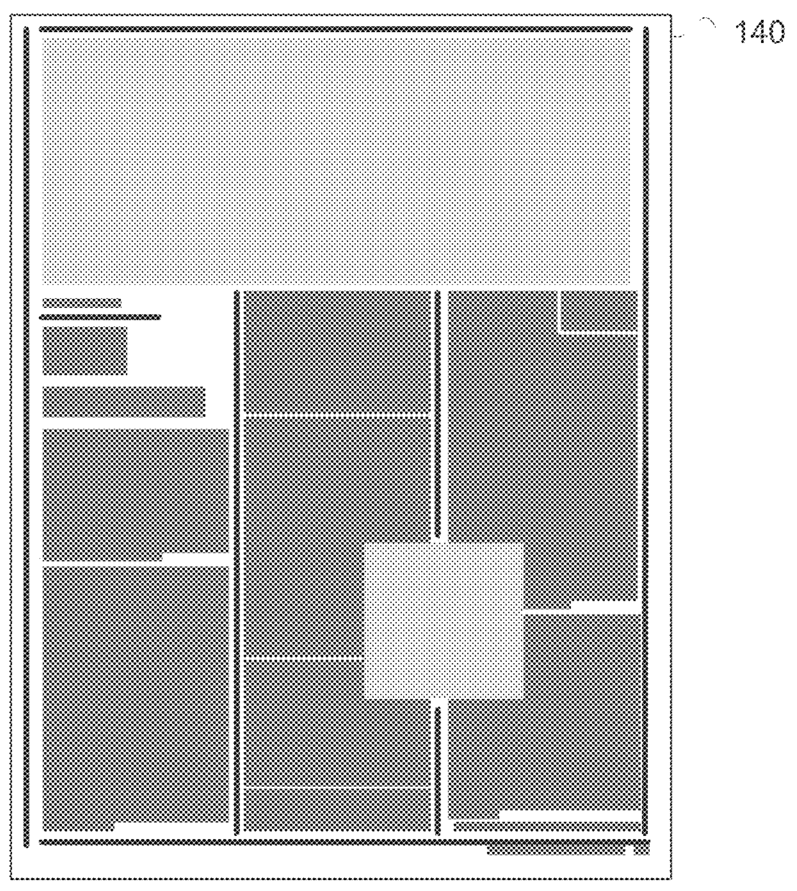

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

As described below in additional detail, when a printed material is scanned by a scanner of an MFP or another document processing system with a scanner, such MFP breaks down each whole page into smaller images. As described below in additional detail, various aspects of processing such a segmented page are by an artificial intelligence (AI) operator. An AI operator may be used to segment content on a scanned page as an image layout or object detection. This segmentation may be used to enhance, including but not limited to optimize, a compression factor during image compression. Conventional image compression technology may be used, which may be incorporated into an MFP. This compression may be same or similar to how applications in personal computers save documents. An AI operator may be used to minimize file sizes of PDFs generated by a conventional Scan-to-PDF function of an MFP. A benefit is smaller file sizes in sending files representing scanned pages by having an MFP process such scanned pages to enhance, namely reduce size, of scanned content in comparison to a preprocessed corresponding scanned image of each such page.

With the above general understanding borne in mind, various configurations for systems, and methods therefor, for reducing data usage by a document processing system are generally described.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms “a”, “an” and “the” are intended to include the plural forms as well, unless the context clearly indicates otherwise. As used herein, the term “if” may be construed to mean “when” or “upon” or “in response to determining” or “in response to detecting,” depending on the context. Similarly, the phrase “if it is determined” or “if [a stated condition or event] is detected” may be construed to mean “upon determining” or “in response to determining” or “upon detecting [the stated condition or event]” or “in response to detecting [the stated condition or event],” depending on the context. It will also be understood that the term “and/or” as used herein refers to and encompasses any and all possible combinations of one or more of the associated listed items. It will be further understood that the terms “includes” and/or “including,” when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system’s registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a “circuit,” “module,” “system,” or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (“RAM”), a read-only memory (“ROM”), an erasable programmable read-only memory (“EPROM” or Flash memory), an optical fiber, a portable compact disc read-only memory (“CD-ROM”), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1-1 is a block diagram of a top-down view depicting an example of a sheet good 101. In this example, sheet good 101 is a sheet of paper for feeding into a scanner, such as of an MFP for example. In this example, sheet good 101 has printed thereon an image 102, generally depicted as a box filled with shading and right-to-left diagonal hashing. Image 102 has a horizonal dimension 104 and a vertical dimension 105. The area taken up by image 102 is small in comparison to total area 103 of sheet good 101 for purposes of scanning of content.

If, for example, image 102 is for a calling or business card, and such image is scanned on an MFP scanner for a letter size, then a file generated may be about 162 kilobytes ("KB") for a 300 dpi ("dots per inch") scanning. An MFP scanner may generate an image size based on a sending size. When checked in a PDF viewer, an image size generated may be about 3300×2550 pixels for 8.5×11 inch (216×279 mm) letter sized with a 300 dpi scanning. However, a calling card may be about 3.5×2.5 inches (8.9×6.4 cm), or roughly about 1050×750 pixels for a 300 dpi scanning.

FIG. 1-2 is a block diagram of a top-down view depicting an example of a sheet good 112 having a same size as image 102. Image 102 may be printed onto sheet good 112. If, for example, image 102 is scanned setting original and sending size to custom at actual width and height of just such card, a result of such a scan may generate a file of approximately 43 KB for a 300 dpi scanning. A check in a PDF viewer of a file generated may be about 43 KB, or roughly about 1049×749 pixels for a 300 dpi scanning. An MFP scanner may generate an image size based on a sending size.

So, in comparing sending sizes of the examples of FIGS. 1-1 and 1-2, there is a substantial difference between 162 KB versus 43 KB, respectively, for a 300 dpi scanning for example (other scanning resolutions may be used in other examples). However, many people may not take the time to crop an image for custom scanning, even if such an option or feature is available.

FIG. 1-3 is a pictorial diagram depicting an example of a PDF viewer screen display 120 of the scan of FIG. 1-1 after processing same. PDF viewer screen display 120 may be displayed on a display 126. In PDF viewer listing 125, a width 128 and a height 127 are about 1050×755 pixels, or about 62 KB for a 300 dpi scanning as the scanned image of the example of FIG. 1-2. In other words, a PDF viewer application may generate an image size based on settings a user input while making such a document in a PDF document creator application.

To recapitulate the examples of FIGS. 1-1 through 1-3, a one-page letter size PDF document produced about a 162 KB file in FIG. 1-1 with a 300 dpi scan. In FIG. 1-2, a reference for a minimum size that an MFP might be able to do to still get all content of an image resulting in about a 43 KB file for a 300 dpi scan. However, a page size for this example is not a standard letter size for example. In FIG. 1-3, a one-page letter size PDF document produced about a 62 KB file size for a 300 dpi scan, namely all the content of image 102 and in a standard letter size for example. Along those lines, by separating content on a letter sized sheet good, for example, content on such a page may be separated into corresponding smaller images. A PDF or other formatted file for a letter or other standard sized scan may be automatically created with a smaller file size than a preprocessed image of a conventional scan.

FIG. 1-4 is a block diagram of a top-down view depicting an example of a preprocessed scanned image 140 of a conventional scan, such as with a scanner of an MFP for example. Preprocessed scanned image 140 is of a standard size, which in this example is a conventional US letter size. Accordingly, such a preprocessed scanned image 140 may have a file size corresponding to or directly proportional to resolution and such standard size, the latter of which may be avoided as described below in additional detail.

A conventional preprocessed page contains one large raster image. For example, all text, table, picture, and white spaces between them are contained in and part of data forming such one large raster image. This conventionally results in a large file size.

As described below in additional detail, a post-processed page contains a segmented document, where such page is separated into images, texts, tables, lines, or other content components, which may exclude spacing between such components, such as white spaces for example. By process a preprocessed image to obtain a post-process page, white spaces may be substantially reduced or eliminated from a file, namely white space bloating up of file size. This reduction may be more noticeable for pages that have contents occupying less than 50% of page area. However, there may be some instances where metadata created from a page in addition to segmented contents result in a post-processed page that has a larger file size than a preprocessed image therefor. As described below in additional detail, a post-processed page may be reverted to a pre-processed page therefor depending upon relative file size of such pages. For each segmentation, metadata which includes the position of each block may be stored. Also, if a page has multiple text blocks, font and font sizes of each block may be recorded as metadata.

FIG. 1-5 is a block diagram of a top-down view depicting an example of a segmented layout 250 of a page from a preprocessed image, such as in this example a preprocessed scanned image 140 of FIG. 1-4. In this example, a three column layout with an image and with an overlay image and overlay text, as well as headings, byline, a source footer and page number is illustratively depicted; however, in another example another type of page layout may be used.

FIG. 2 is a flow diagram depicting an example of a data usage reduction flow ("flow") 200. With simultaneous reference to FIGS. 1-4, 1-5 and 2, data usage reduction flow 200 is further described.

At operation 201, a preprocessed image or images of a document may be obtained. For example, an MFP or other document processing system with a scanner or imager may be used to scan a single page or multiple pages of a document to obtain a preprocessed scanned image or images corresponding to such page or pages, respectively.

At operation 202, a check for a page of a scanned document or other set of one or more pages may be performed. If a page of a preprocessed image 140 is obtained at operation 202, then such page may be passed down for operation 203 and a check for a next page of a scanned document may be performed, as generally indicated. If, however, no page is found at operation 202, then flow 200 may end for input of a scanned document. Any one or more pages in a pipeline for being processed by flow 200 may continue to be processed even through checking for another page of a scanned document has ceased for a scanned document currently being processed.

At operation 203, a segmented layout 250 of a page obtained at 202 may be detected from a preprocessed scanned image ("preprocessed image") 140 of such a page. Such a page may be input via scanning at operation 201 or selecting from an input file 212 of a scanned document having one or more pages.

At operation 204, components of a segmented layout 250 detected may be separated into one or more blocks. At operation 205, each type of the one or more blocks separated out may be identified. In this example layout 250, there are text blocks or segments 254, image blocks or segments 253, horizontal line blocks or segments 252, and vertical line blocks or segments 251. Not all of a text block may be filled with text, for example at the end of a paragraph there may be a partial width line of text in contrast to a full width line of text, such as in text segment 254P.

Furthermore, one block or segment may be layered on another block or segment. For example, text segment 254P has layered on top a text segment 254H. Similarly, an image block or segment may be layered on top of another image block or segment or a text block or segment. For example, image block 253T is layered over a lower left corner of text segment 254P. However, a text block 254P boundary exists under image block 253T as generally indicated by dotted line 255. Same or similarly, an upper right portion of text block 254P extends below text block 254H though not illustratively depicted with a dotted line.

At operation 206, each block identified of one or more blocks may be converted into an associated object or type. For example, a block of one or more blocks may be identified as a text block at operation 205. In response to identification as a text block, at operation 206 such a text block may be converted to text.

Recall, a preprocessed image is obtained from which a text block is identified, so for example such a text block image may be converted to text with optical character recognition ("OCR") of a document processing system. For example, OCR or other type of image-to-text converter may be part of or accessible by a document processing system. For purposes of efficiency, each text block identified in a page may be processed first before processing any other type of block. However, in another example, each upper layer block may be processed before each lower layer block. In another example, a combination of block type and layer may be used for determining a processing order.

Detecting, separating, identifying, and converting of a text block or segment may be performed in software. Existing AI software in combination with image-to-text converter software may be used. For example, LayoutLMv3 AI software may be used.

An MFP or generally document processing system at operation 207 may store or save metadata for a block or segment converted at operation 206. Examples of meta information for text may be font type, font size, location of such block on a page, dimensions, layering information, among other metadata.

At operation 205, a table or a picture or a picture image block may be identified from a preprocessed image of a page. For a table or picture/image block, such a block or segment may be converted into a corresponding object at operation 206. At operation 207, meta information, such as for example dimensions, location on a page, layering information, or other meta information, for such object may be stored or saved.

At operation 204, one or more lines, such as for example vertical lines 251 or horizontal lines 252, of a layout 250 may be separated or segmented out. At operation 205, such one or more lines of a layout may be identified as such. At operation 206, such one or more lines may be converted into drawing commands. At operation 207, meta information, such as location, orientation, length, thickness, color, among other information, may be stored in association with such one or more lines. At operation 208, a formatted page for an associated page may be constructed with various items to include text, objects, and drawing commands, as well as each of their associated meta information. In this example, drawing commands are portable document format drawing commands; however, in another example another type of drawing commands may be used.

At operation 208, a formatted page for a page may be constructed. Such a constructed formatted page may include text or object(s), as well as meta information therefor. In this example, such a formatted page is a PDF page. However, another type of portable document formatted page may be used in another example.

At operation 209, it may be determined whether a formatted page has a larger storage or file size than a preprocessed image of such formatted page. If at operation 209 such a formatted page file size is larger than that of a preprocessed image therefor, then at operation 211 such preprocessed image is stored or sent, such as in a scan-to-store or scan-to-send operation. If, however, at operation 209 it is determined that a formatted page file size is not larger, namely smaller or equal, in file size to that of a corresponding preprocessed image therefor, then such formatted page file is stored or sent such as in a scan-to-store or scan-to-send operation 210 in place or instead of such corresponding preprocessed image therefor. Such a formatted page may be stored in page form, as contrasted to a business card image as in FIG. 1-2.

In response to a formatted page having a smaller storage size than a preprocessed image of a corresponding page as determined at operation 209, at operation 210 such a formatted page may be stored in a document processing system in place of a corresponding preprocessed image, and from operation 210 such stored formatted page may be distributed responsive to a send command asserted to such document processing system, such as for example an MFP.

FIG. 3 is a pictorial diagram depicting an example of a user interface display 301 of a touch screen 300 of a document processing system, such as an MFP for example. User interface display 301 is conventional, except for addition of a "Smart File Size Optimization" option or function 302. Such option or function 302 may be an instantiation of program code in such an MFP for providing a program product in accordance with flow 200 of FIG. 2.

To recapitulate by way of example and not limitation, in creating PDF jobs from personal computer ("PC") applications for example, a user may add contents, whether an image, text, or other content, to a document. When saving such a document to PDF, a PC application compresses each image object into Xobjects for example and writes a layout and other information in conformance to PDF specifications. As described above, an MFP is configured to automatically analyze a scanned document and recreate what a PC application might do given a user's content. An MFP is configured to detect individual components of each page of a document and separate component content into individual objects. An AI's layout detection technology may be used for such segmentation. As described above, image and text segments are used to determine whether segmenting a page of a document into individual text and image segments effectively reduces file size for such page.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figures 1, 2, 3, 4, 5:
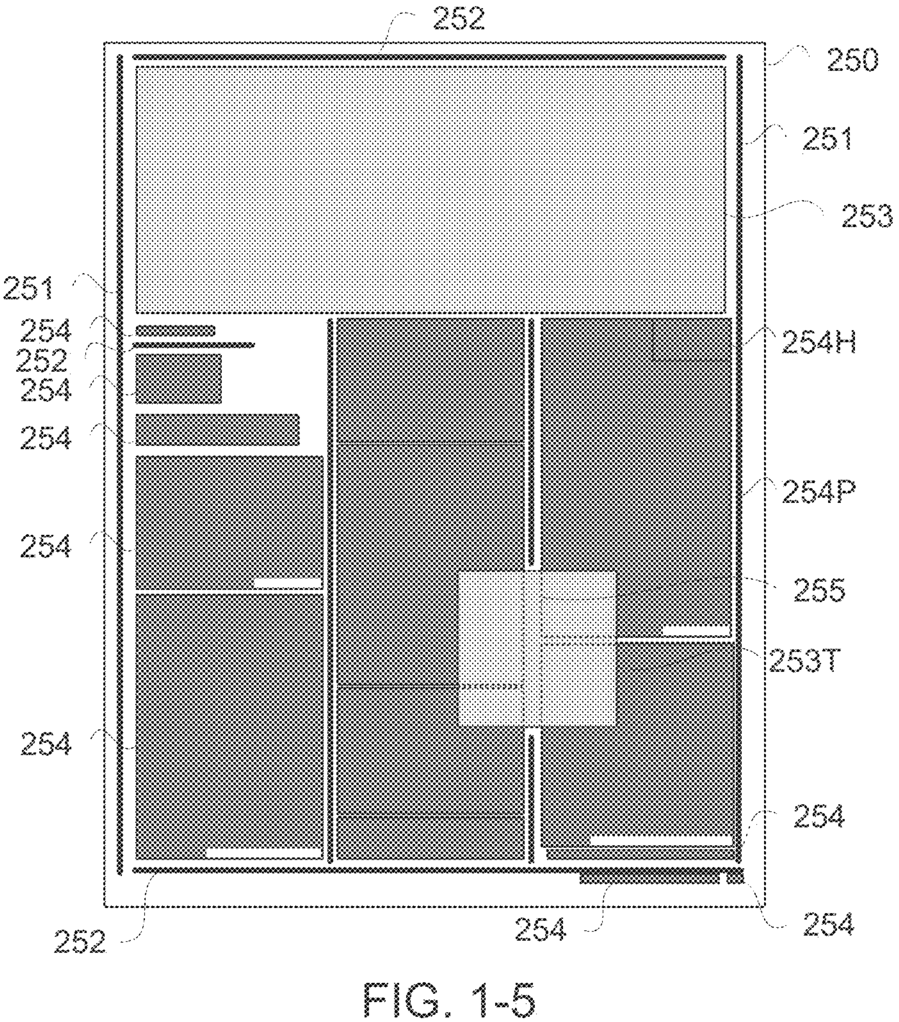
Figure 2:
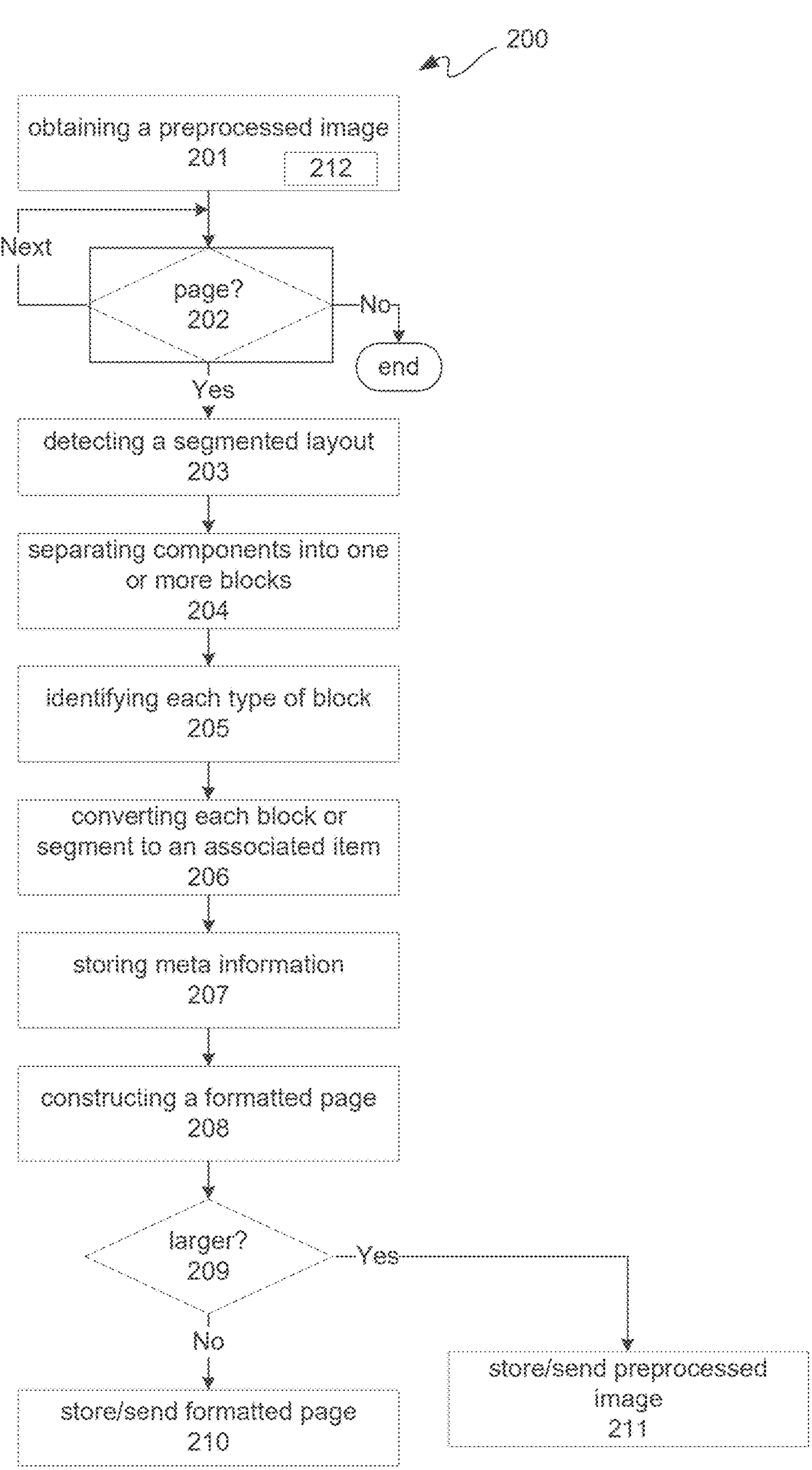
Figure 3:
Figure 4:
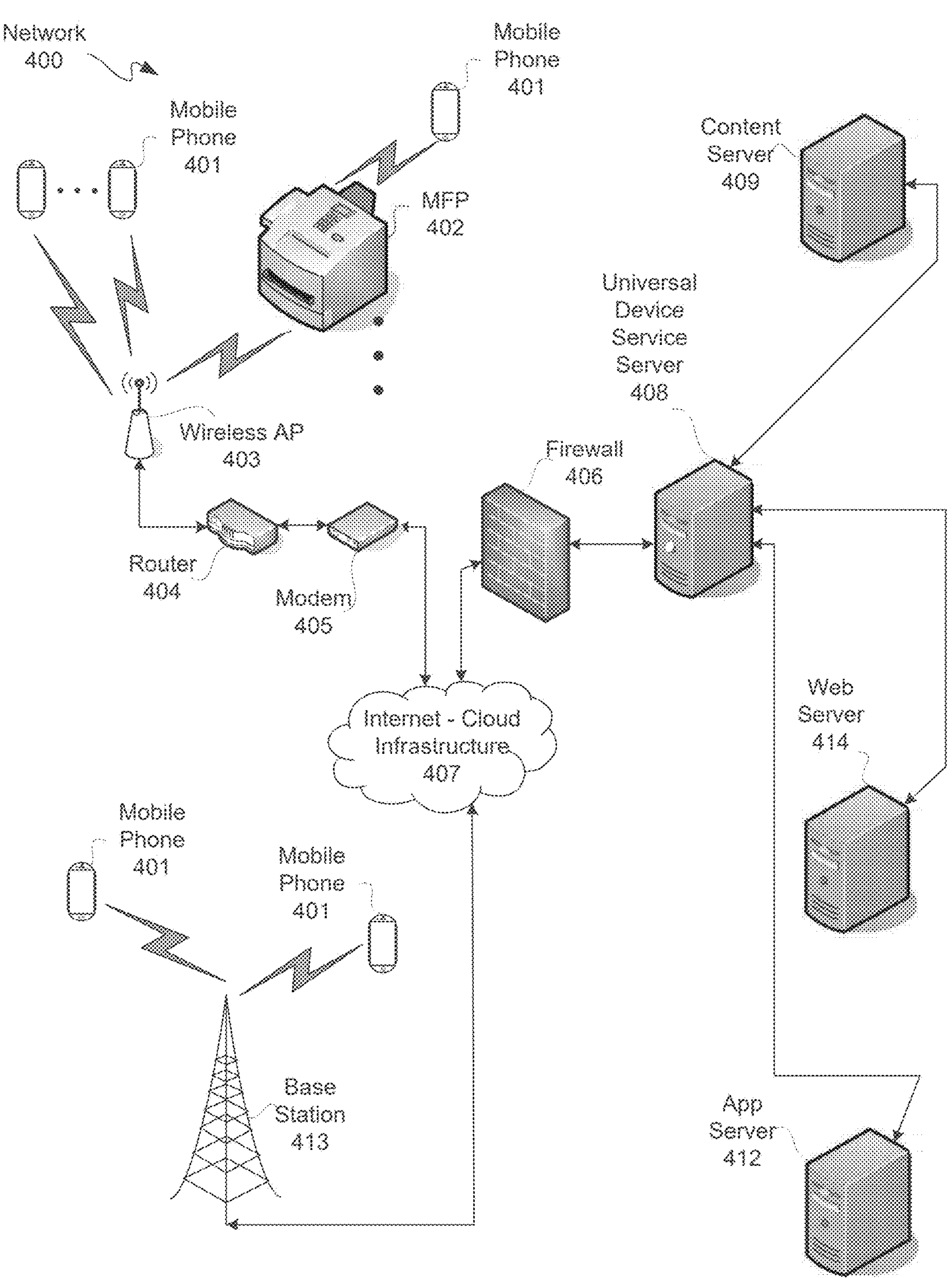
Figure 5:
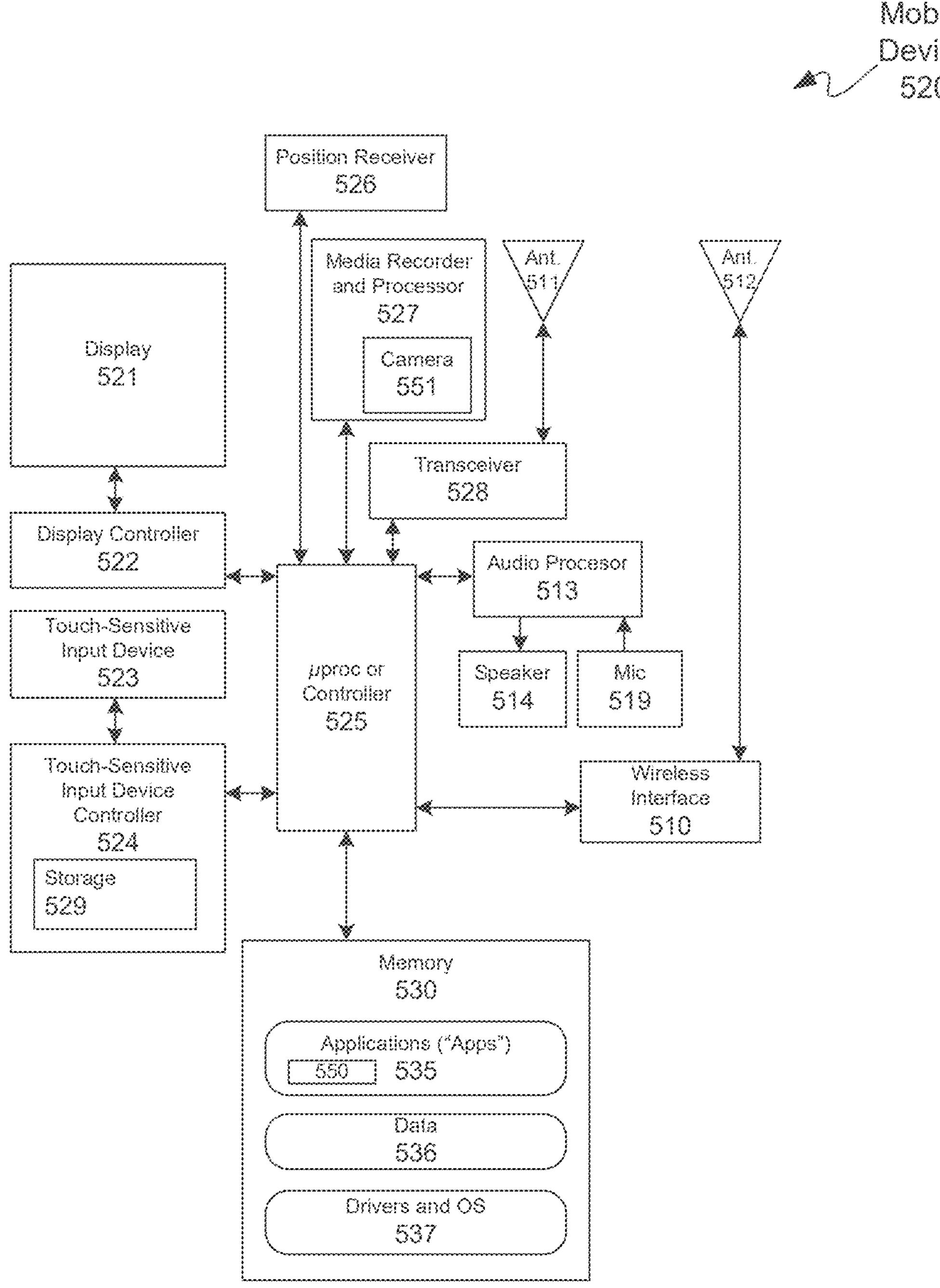

FIG. 5 is a block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps, such as a mobile client application as described hereinabove, may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data. Apps 535 may include an app 550 for an MFP driver. However, in another example, an MFP driver may be included in drivers 537.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
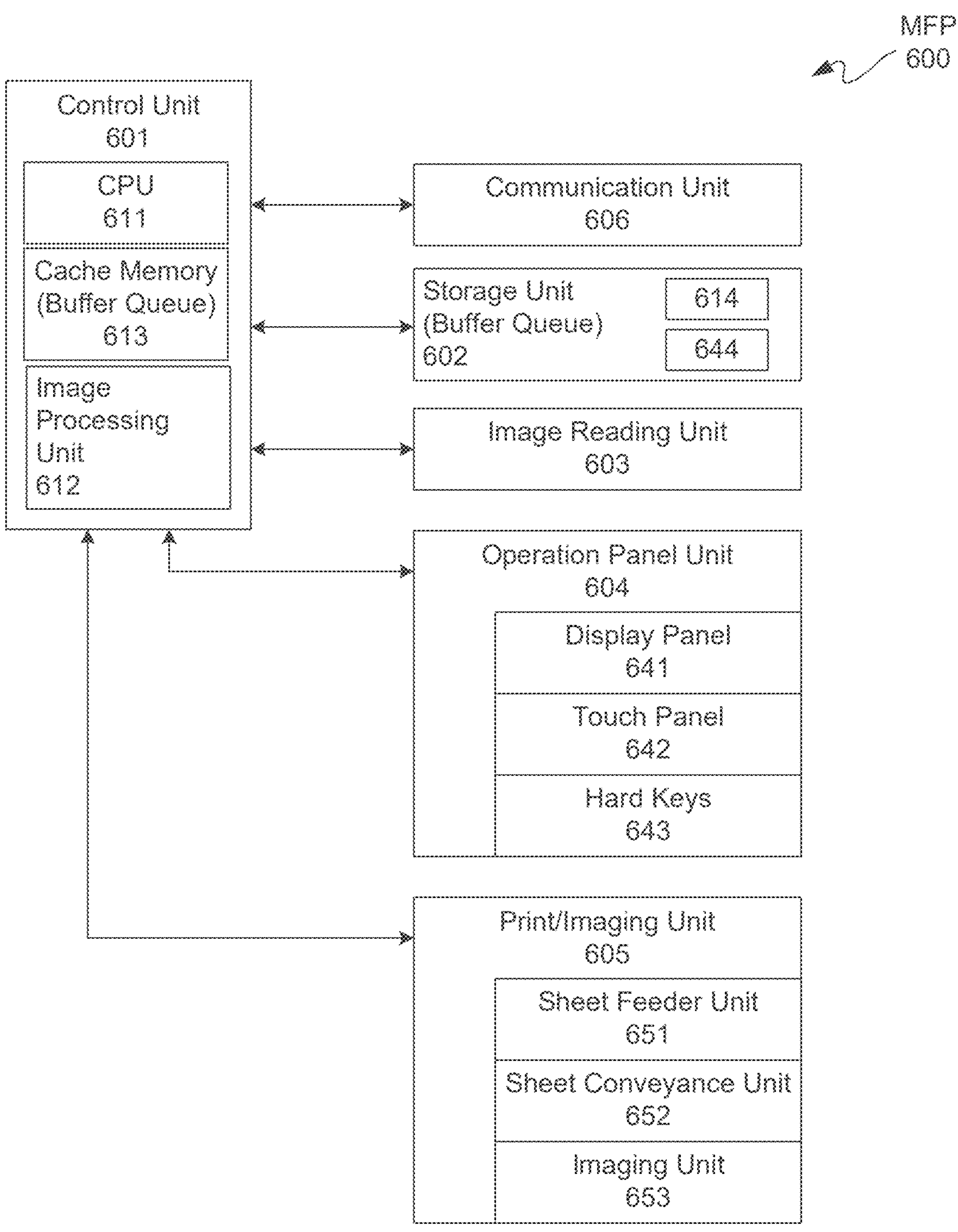
FIG. 6 is a block diagram depicting an example of a multi-function printer (MFP).

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Image processing unit 612 may be configured with an imposition service 351, as previously described.

Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614 and a printer job settings app 644. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
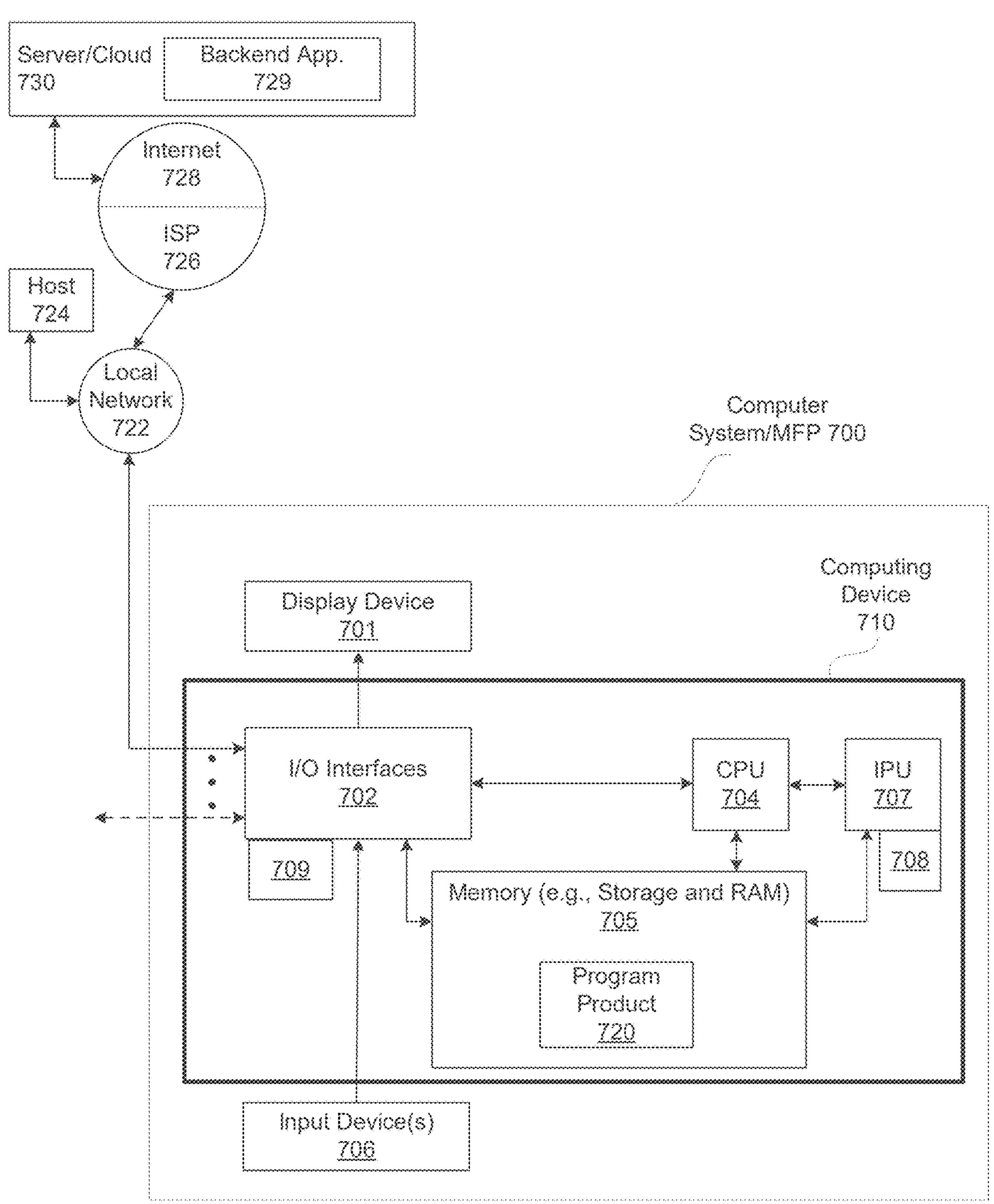
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. For example, program product 720 may include an information and document handling manager for a programmed document server for feeding documents for processing with flow 200 of FIG. 2. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for reducing data usage by a document processing system, comprising:
- detecting a segmented layout of a page from a preprocessed image thereof;
- separating components of the layout into one or more blocks;
- identifying each type of the one or more blocks;
- converting a block of the one or more blocks identified as a text block to text;
- storing meta information for the block;
- constructing a formatted page for the page including the text and the meta information;
- determining whether the formatted page has a smaller storage size than the preprocessed image associated with the formatted page;
- responsive to the formatted page not having a smaller storage size than the preprocessed image, processing the preprocessed image with a scan-to-store or scan-to-send operation of the document processing system; and
- responsive to the formatted page having a smaller storage size than the preprocessed image, using the formatted page in place of the scan-to-store or scan-to-send operation of the preprocessed image.

2. The method according to claim 1, wherein the one or more blocks are two or more blocks, and wherein the block is a first block, the method further comprising:
- separating a second block of the two or more blocks from the preprocessed image of the page identified as an image block;
- converting the image block into an object; and
- wherein the constructing of the formatted page for the page includes the text, the meta information, and the object.

3. The method according to claim 2, wherein the detecting, the separating of the first block, the separating of the second block, the identifying, the converting of the text block, and the converting of the image block are performed in software.

4. The method according to claim 3, wherein the software is LayoutLMv3.

5. The method according to claim 1, further comprising:
- separating one or more lines of the layout;
- converting the one or more lines of the layout into drawing commands;
- wherein the constructing of the formatted page for the page includes the text, the meta information, the object, and the drawing commands.

6. The method according to claim 5, wherein:
- the drawing commands are portable document format drawing commands; and
- the formatted page is a portable document format page.

7. The method according to claim 6, wherein the image block is a picture or a table.

8. The method according to claim 5, further comprising responsive to the formatted page having a smaller storage size than the preprocessed image of the page, sending the formatted page from the document processing system in place of the preprocessed image.

9. The method according to claim 5, further comprising:
- responsive to the formatted page having a smaller storage size than the preprocessed image of the page, storing the formatted page from the document processing system in place of the preprocessed image; and
- distributing the formatted page responsive to a send command.

10. The method according to claim 9, wherein the formatted page is stored in page form.

11. The method according to claim 10, wherein the first block is converted to text with optical character recognition of the document processing system.

12. An apparatus, comprising:
- a document processing system with a system memory, a data storage, one or more processor units, and an interface;
- the system memory configured to store program code including document services;
- the interface coupled for receiving user requests for the document services;
- wherein, in response to executing the program code, the document processing system is configured to initiate operations for implementing a process for reducing data usage, the process including:
- detecting a segmented layout of a page from a preprocessed image thereof;
- separating components of the layout into one or more blocks;
- identifying each type of the one or more blocks;
- converting a block of the one or more blocks identified as a text block to text;
- storing meta information for the block;
- constructing a formatted page for the page including the text and the meta information; and
- determining whether the formatted page has a smaller storage size than the preprocessed image associated with the formatted page;
- responsive to the formatted page not having a smaller storage size than the preprocessed image, processing the preprocessed image with a scan-to-store or scan-to-send operation of the document processing system; and
- responsive to the formatted page having a smaller storage size than the preprocessed image, using the formatted page in place of the scan-to-store or scan-to-send operation of the preprocessed image.

13. The apparatus according to claim 12, wherein the one or more blocks are two or more blocks, and wherein the block is a first block, the process further comprising:
- separating a second block of the two or more blocks from the preprocessed image of the page identified as an image block;
- converting the image block into an object; and
- wherein the constructing of the formatted page for the page includes the text, the meta information, and the object.

14. The apparatus according to claim 13, wherein the detecting, the separating of the first block, the separating of the second block, the identifying, the converting of the text block, and the converting of the image block are performed in software.

15. The apparatus according to claim 13, wherein the process further comprises:

separating one or more lines of the layout;

converting the one or more lines of the layout into drawing commands;

wherein the constructing of the formatted page for the page includes the text, the meta information, the object, and the drawing commands.

16. The apparatus according to claim 15, wherein:

the drawing commands are portable document format drawing commands;

the formatted page is a portable document format page; and the image block is a picture or a table.

17. The apparatus according to claim 15, further comprising responsive to the formatted page having a smaller storage size than the preprocessed image of the page, sending the formatted page from the document processing system in place of the preprocessed image.

18. The apparatus according to claim 15, further comprising:

responsive to the formatted page having a smaller storage size than the preprocessed image of the page, storing the formatted page from the document processing system in place of the preprocessed image; and distributing the formatted page responsive to a send command.

19. The apparatus according to claim 18, wherein the formatted page is stored in page form.

20. The apparatus according to claim 19, wherein the first block is converted to text with optical character recognition of the document processing system.

* * * * *